United States Patent
Jovanovic et al.

(10) Patent No.: US 6,791,743 B2
(45) Date of Patent: Sep. 14, 2004

(54) HIGH AVERAGE POWER SCALING OF OPTICAL PARAMETRIC AMPLIFICATION THROUGH CASCADED DIFFERENCE-FREQUENCY GENERATORS

(75) Inventors: Igor Jovanovic, Oakland, CA (US); Brian J. Comaskey, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 17 days.

(21) Appl. No.: 10/304,235

(22) Filed: Nov. 26, 2002

(65) Prior Publication Data

US 2003/0112493 A1 Jun. 19, 2003

Related U.S. Application Data

(60) Provisional application No. 60/340,126, filed on Dec. 13, 2001.

(51) Int. Cl.[7] .............................. H01S 3/00; G02F 2/02
(52) U.S. Cl. ...................... 359/333; 359/346; 359/330
(58) Field of Search ................................. 359/333, 346, 359/330

(56) References Cited

U.S. PATENT DOCUMENTS

| | | | |
|---|---|---|---|
| 4,349,907 A | * | 9/1982 | Campillo et al. ............. 372/92 |
| 5,047,668 A | | 9/1991 | Bosenberg |
| 5,400,350 A | | 3/1995 | Galvanauskas |
| 5,696,782 A | | 12/1997 | Harter et al. |
| 5,862,287 A | | 1/1999 | Stock et al. |
| 6,047,011 A | * | 4/2000 | Cook ............................ 372/22 |
| 6,181,463 B1 | | 1/2001 | Galvanauskas et al. |
| 6,198,568 B1 | | 3/2001 | Galvanauskas et al. |
| 6,208,458 B1 | | 3/2001 | Galvanauskas et al. |
| 6,282,014 B1 | | 8/2001 | Long |
| 6,320,886 B1 | | 11/2001 | Dawber et al. |
| 6,334,011 B1 | | 12/2001 | Galvanauskas et al. |
| 2002/0001321 A1 | | 1/2002 | Perry |

OTHER PUBLICATIONS

Mark A. Dreger, et al., "Coupled thermal and nonlinear effects for beam propagation in anisotropic crystals," SPIE, vol. 2145, pp. 254–269 (16 pages), 0–8194–1440, 9/94.
John Collier, et al., "Evaluation of an ultrabroadband high–gain amplification technique for chirped pulse amplification facilities," Applied Optics, vol. 38, No. 36, pp. 7486–7493, (8 pages), Dec 20, 1999.
David Eimerl, "High Average Power Harmonic Generation," IEEE Journal of Quantum Electronics, vol. QE–23, No. 5, pp. 575–592 (18 pages), May 1987.
David Eimerl, "Frequency conversation materials from a device perspective," SPIE vol. 681, Laser and Nonlinear Optical Materials, pp. 2–5 (4 pages), 1986.
A. Dubietis, et al., "Powerful femtosecond pulse generation by chirped and stretched pulse parametric amplification in BBO crystal," Optics Communications 88, pp. 437–440 (4 pages), Apr. 1, 1992.

* cited by examiner

Primary Examiner—Mark Hellner
(74) Attorney, Agent, or Firm—Eddie E. Scott; Alan H. Thompson

(57) ABSTRACT

A first pump pulse and a signal pulse are injected into a first optical parametric amplifier. This produces a first amplified signal pulse. At least one additional pump pulse and the first amplified signal pulse are injected into at least one additional optical parametric amplifier producing an increased power coherent optical pulse.

11 Claims, 2 Drawing Sheets

HIGH AVERAGE POWER SCALING OF OPTICAL PARAMETRIC AMPLIFICATION THROUGH CASCADED DIFFERENCE-FREQUENCY GENERATORS

CROSS-REFERENCE TO RELATED APPLICATIONS

This application claims the benefit of U.S. Provisional Application No. 60/340,126 filed Dec. 13, 2001 entitled "High Average Power Scaling of Optical Parametric Amplification Through Cascaded Difference Frequency Generators."

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to optical amplification and more particularly to an optical parametric amplifier system.

2. State of Technology

U.S. Pat. No. 5,400,350 for a method and apparatus for generating high energy ultrashort pulses to Almantas Galvanauskas, issued Mar. 21, 1995 provides the following background information, "Both semiconductor sources (e.g., diode) and fiber sources are known which can produce ultrashort energy pulses having sub-picosecond pulse durations. Although these energy sources can provide reliable, robust operation in a compact, cost-effective manner, their inability to produce pulse energies comparable to those of large frame solid-state sources has limited their practical use."

U.S. Pat. No. 2002/0001321 for an ultrashort-pulse laser machining system employing a parametric amplifier to Michael D. Perry, published Jan. 3, 2002 provides the following background information, "Bulk optical parametric amplifiers have not been considered to date for moderate to high average power, ultrashort-pulse applications. The present optical parametric amplifier system does not rely on quasi-phase matching and can achieve both high average power and high gain for broad bandwidth chirped-pulses from a single or double stage system. By relying on parametric conversion rather than conventional laser amplification, there is no residual energy left within the gain medium. As a result, there are negligible thermal gradients and hence, one eliminates the depolarization and pulse distortion problems that severely impact the pulse quality and electrical to optical conversion efficiency of high average power ultrashort-pulse lasers. In addition to eliminating many of the thermal management problems associated with the high gain amplifier, the use of a parametric amplifier enables the production of the necessary ultrashort duration pulses from a simplified and more compact system. The pulses exiting the parametric amplifier may be compressed directly and used for machining or surgery or may be further amplified in a conventional laser amplifier to provide additional pulse energy before compression."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for producing an increased power coherent optical pulse. A first optical parametric amplifier and at least one additional optical parametric amplifier are provided. A first pump pulse and a signal pulse are injected into the first optical parametric amplifier producing a first amplified signal pulse from the first optical parametric amplifier. At least one additional pump pulse and the first amplified signal pulse are injected into the at least one additional optical parametric amplifier producing an output that results in the increased power coherent optical pulse. In an embodiment of the present invention, at least a second additional optical parametric amplifier is provided. At least a second additional pump pulse is injected into the at least a second additional optical parametric amplifier and at least a second additional signal pulse is injected into the at least a second additional optical parametric amplifier producing an output that results in the increased power coherent optical pulse. One embodiment of a system constructed in accordance with the present invention includes a first optical parametric amplifier, at least one additional optical parametric amplifier, a source of a first pump pulse that is direct into the first laser optical parametric amplifier, a source of a signal pulse that is direct into the first optical parametric amplifier, a source of at least one additional pump pulse that is direct into the at least one additional optical parametric amplifier, and a source of at least one additional signal pulse that is direct into the at least one additional optical parametric amplifier.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
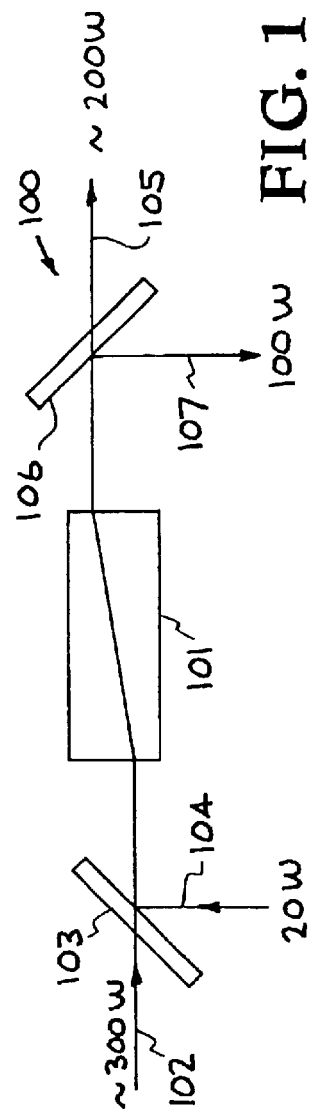
FIG. 1 shows the final OPA in a high average power system.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Few laser materials exhibit broad spectral bandwidth and favorable thermal properties for scaling to high average power. While Ti:sapphire allows amplification of ultrashort pulses, it is limited in average power to several tens of watts due to high heat load. Yb:YAG, a material with favorable thermal properties and smaller quantum defect, has been scaled beyond a kW, but it does not permit pulses shorter than approximately 1 ps due to its bandwidth limitations. Optical parametric amplifiers represent a class of amplifiers that have capability to scale to higher average power as a result of negligible thermal load in the amplifier, while permitting pulses as short as 10 fs.

Optical parametric amplification is an elastic process which exhibits no intrinsic heat load, which makes it attractive for development of sources that are currently limited by problems with heat load. Through use of cascaded difference frequency generators, it is possible to distribute the residual heat load due to short wavelength pump absorption into several amplification stages and increase the total average power.

A particularly attractive and frequently overlooked feature of optical parametric amplification is the absence of intrinsic heat load in the nonlinear frequency conversion process. In conventional gain materials based on a laser transition, heat generation is a consequence of three factors: energy gap between the pump level and the fluorescence transition level leads to nonradiative phonon transitions; quantum efficiency of fluorescence is less than 100%; and, normal material absorption occurs in laser material. Optical parametric amplification is, on the other hand, a "perfectly elastic" process, in which energy is conserved in the optical field. The difference between the energy levels of pump and signal photons is channeled to the third optical wave—idler. This characteristic of OPA is sometimes viewed as the conservation of the photon number, and it is expressed by Manley-Rowe relations.

With the absence of the quantum defect and with the quantum efficiency of 100% to signal and idler, the only heat load that remains in OPA comes from material absorption due to the imaginary part of the dielectric susceptibility. It is therefore of foremost importance to identify the materials which, along with their favorable nonlinear properties, exhibit high transparency for all wavelengths involved in the process.

Similar to laser gain media, it is important that nonlinear crystals exhibit favorable thermo-mechanical properties. In addition, thermally induced dephasing represents an important consideration in selection of thermally loaded nonlinear crystals. Beta-barium borate (BBO) has been identified earlier as the material with an exceptional promise for high average power nonlinear optics applications. The absorption coefficients in BBO have been measured to be <0.2% $cm^{-1}$ for 1064 nm wavelength, and <1% $cm^{-1}$ for 532 nm. The absorption in BBO is due entirely to the presence of inclusions, and it is expected that the absorption can be reduced through improvements in crystal growth. In the calculations presented here, conservative values for absorption coefficients given above are used.

BBO is a negative uniaxial crystal, with a broad transparency range (0.198–2.6 $\mu$m at 50% level). Temperature-induced wave vector mismatch calculations indicate a particularly broad temperature bandwidth in BBO, allowing relatively large temperature gradients. When considering BBO OPAs, one of the limiting factors is the narrow angular tolerance for pulses with extraordinary polarization, leading to the requirement for good collimation and beam quality of the pump laser. In high average power applications, thermal load leads to a temperature distribution in the crystal. Refractive index gradient is then a result of the temperature-dependent refractive index and the stress distribution through stress-optic coefficients. As a result, thermal lens arises in the gradium-index medium and modifies the beam diameter and divergence as it propagates through the crystal. A small change of beam diameter does not severely influence conversion efficiency of OPA working in the regime of strong pump depletion. An important feature of absorption in BBO is the fact that the absorption of shorter wavelength light is stronger than the absorption of longer wavelength light. Since the absorption in OPA is dominated by the shorter wavelength (pump), a multicrystal scheme is used which limits the heat load through each individual crystal.

Referring now to FIG. 1, an illustration of a system is provided setting out background for the present invention. The system is designated generally by the reference numeral 100. FIG. 1 shows the final OPA 101 in a high average power system. Incident pump pulse 102 is used to pump the OPA 101. Dichroic beamsplitter 1–3, highly transmissive for pump wavelength and polarization, and highly reflective for signal wavelength and polarization, is used to couple the signal and pump pulse into the OPA 101. Incident signal pulse 104 is used to seed the OPA 101. Dichroic beamsplitter 105, highly transmissive for pump wavelength and polarization, and highly reflective for signal wavelength and polarization, is used to separate the signal and pump pulse emerging from the OPA 101. The amplified signal pulse 107 emanates from the OPA 101. The residual unconverted pump pulse 106 from the OPA 101 is discarded. As shown in FIG. 1, the last OPA 101 can be subjected to the maximum allowed pump power for assumed negligible seed input without thermal crystal degradation and/or OPA crystal fracture, and with the acceptable level of reduction in nonlinear conversion. The last power amplifier OPA 101 can be exposed to the maximum allowed pump power (290 W) for assumed seed input of 20 W without thermal crystal degradation and/or crystal fracture. Assuming 30% conversion efficiency (a conservative and experimentally confirmed value), the maximum signal output from this kind of system would not exceed 100 W. In the example shown in FIG. 1, it is assumed that the thermal limit in OPA made of BBO with the pump pulse only is 300 W.

Figure 2:
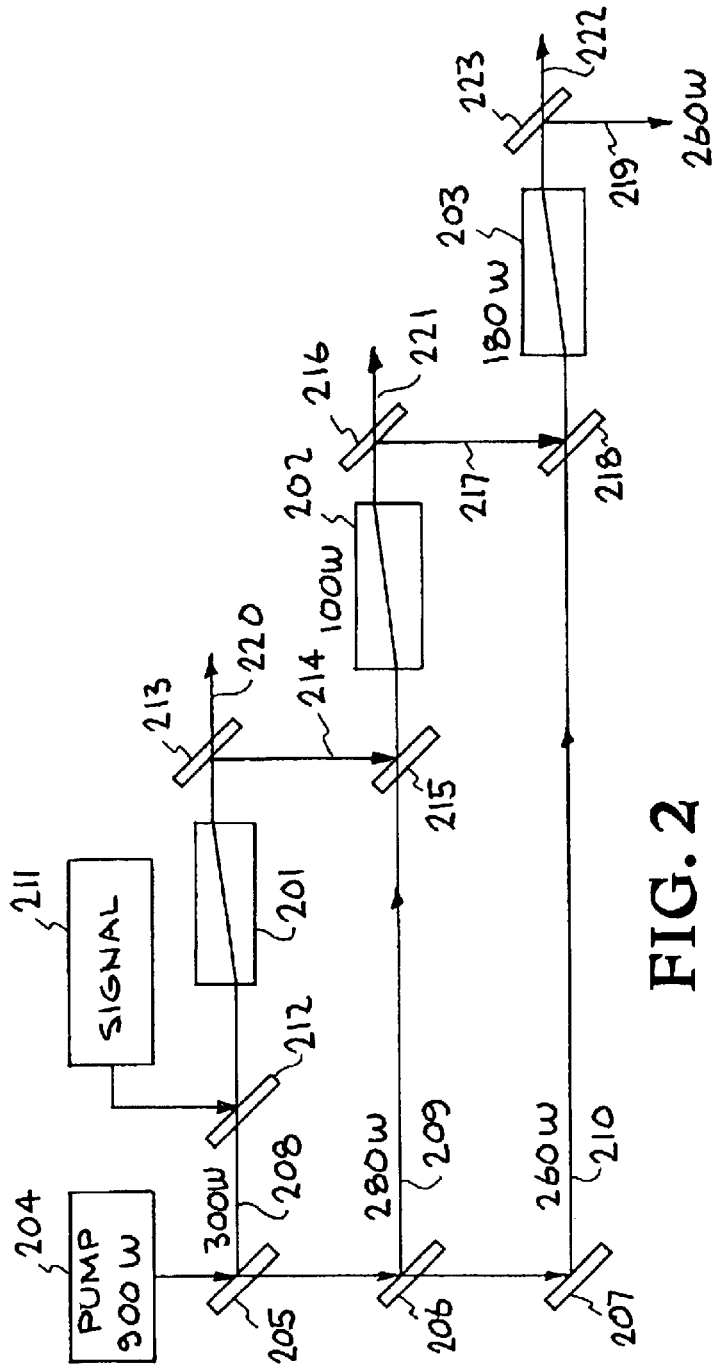
FIG. 2 illustrates an embodiment of a system constructed in accordance with the present invention.

FIG. 2 illustrates how a simple optical parametric amplifier (OPA) 200 can be modified to allow distribution of more total pump power into several OPAs. Three OPAs 201, 202, and 203 are pumped by a total of 900 W of pump power, but still within the limits for material fracture for each individual crystal. An amplified signal pulse 214 emanates from the first OPA 201. An amplified signal pulse 217 emanates from the second OPA 202. An amplified signal pulse 219 emanates from the third OPA 203. The optical parametric amplifier 200 can be used in various applications utilizing high average power chirped pulse amplification. A 900 W pump 204 is split by a series of beamsplitters 205, 206, and 207 into three (300 W, 280 W, and 260 W) pulses 208, 209, and 210, which are used to pump the three OPAs 201, 202, and 203.

The incident signal pulse 211 is used to seed the first OPA 201. The dichroic beamsplitter 212, highly transmissive for pump wavelength and polarization, and highly reflective for signal wavelength and polarization, is used to couple the signal 211 and pump pulse 208 into the first OPA 201. The dichroic beamsplitter 213, highly transmissive for pump wavelength and polarization, and highly reflective for signal wavelength and polarization, is used to separate the signal 214 and pump pulse 220 emerging from the first OPA 201. Residual unconverted pump pulse 220 from the first OPA 201 is discarded.

The dichroic beamsplitter 215, highly transmissive for pump wavelength and polarization, and highly reflective for signal wavelength and polarization, is used to couple the signal 214 and pump 209 pulse into the second OPA 202. The dichroic beamsplitter 216, highly transmissive for pump wavelength and polarization, and highly reflective for signal wavelength and polarization, is used to separate the signal 217 and pump pulse 221 emerging from the second OPA 202. Residual unconverted pump pulse 221 from the second OPA 202 is discarded.

The dichroic beamsplitter 218, highly transmissive for pump wavelength and polarization, and highly reflective for signal wavelength and polarization, is used to couple the signal 217 and pump 210 pulse into the third OPA 203. The dichroic beamsplitter 223, highly transmissive for pump wavelength and polarization, and highly reflective for signal wavelength and polarization, is used to separate the signal 219 and pump pulse 222 emerging from the third OPA 203. Residual unconverted pump pulse 222 from the third OPA 203 is discarded.

It is to be understood that instead of using a single 300 W pump pulse 204, the three pump pulses 208, 209, and 210 can be originating from more than one pump laser, relaxing the requirements on individual pump laser power. Cascaded OPAs in this configuration work in a large-signal regime (difference-frequency generators), adding ~30% of the pump pulse energy to the signal pulse even as the pulse energies of signal and pump become comparable. Idler pulse is discarded after each OPA using angular separation, which allows the large spectral bandwidth to remain conserved.

In the three-stage system 200 shown in FIG. 2, the average power limit is increased by a factor of 2.6. An advantage of this architecture is that there is no sacrifice in the total conversion efficiency, because the signal power represents a nearly fixed fraction of pump power in every stage. In this way, the average power of OPA can be scaled in any OPA if a combination of signal and idler wavelength with absorption lower than at the pump wavelength is used, since the thermal effect of absorption of short wavelength pump pulse is greatly reduced.

The optical parametric amplifier 200 minimizes the thermal impact of the pump laser on high power OPAs, permitting higher power signal outputs, while allowing the production of short pulses (as short as 10 fs in OPCPAs). The optical parametric amplifier 200 presents a scalable architecture for optical parametric amplifiers (OPAs) that allows higher average power signal output than would be permitted due to the thermal stresses induced by pump absorption. Performance level is set more by the much lower signal absorption.

The three OPAs 201, 202, and 203 are nonlinear crystals. The OPAs 201, 202, and 203 shown in FIG. 2 are beta-barium borate (BBO) crystals; however, it is to be understood that other nonlinear medium could be used.

Figure 3:
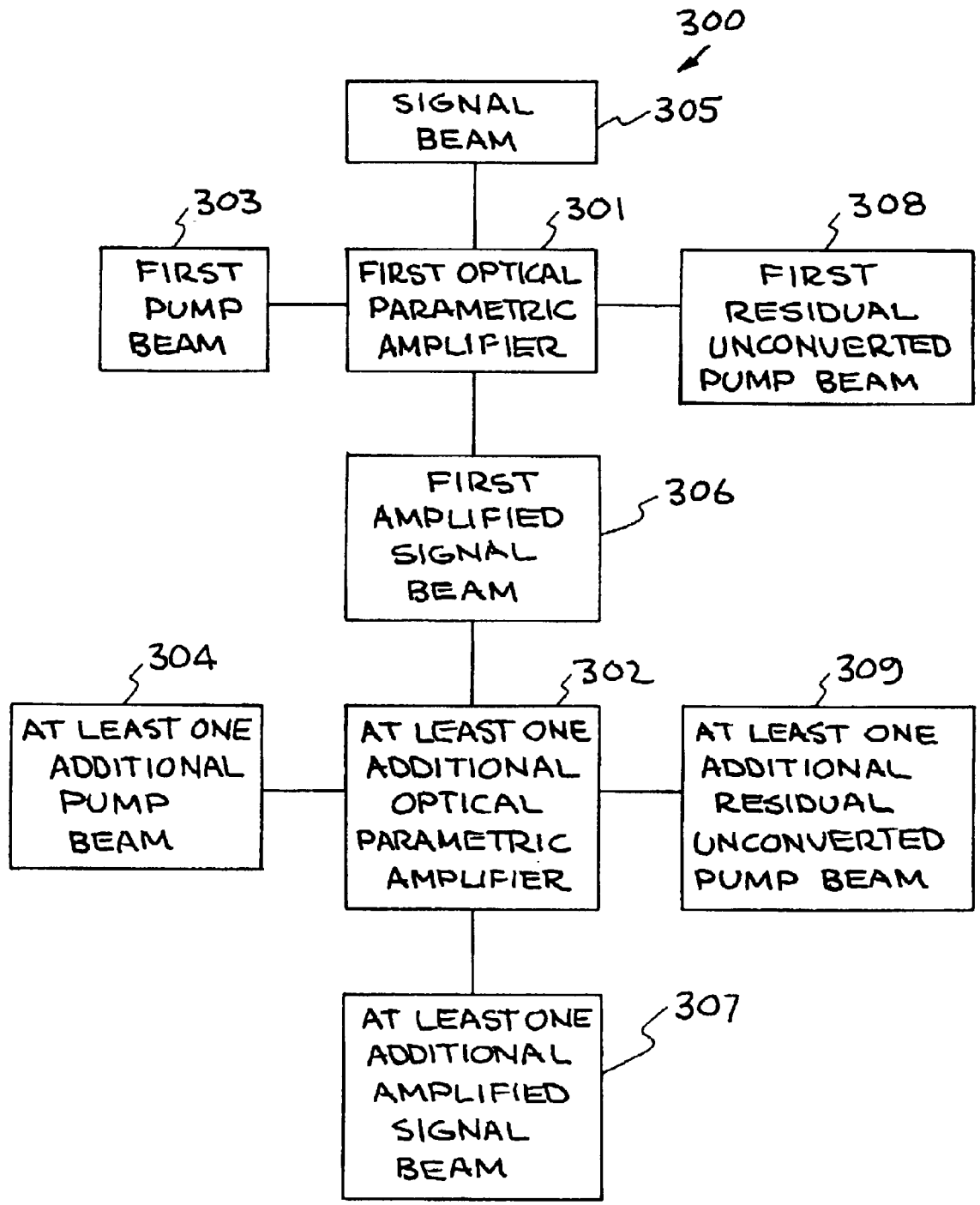
FIG. 3 a flow diagram illustrating another embodiment of a system constructed in accordance with the present invention.

Referring now to FIG. 3, a flow diagram illustrating another embodiment of a system constructed in accordance with the present invention is shown. The system is designated generally by the reference numeral 300. The system 300 illustrates the high average power scaling of optical parametric amplification through cascaded difference frequency generators.

The optical parametric amplifier system 300 allows distribution of more total pump power into a number of optical parametric amplifiers. The parametric amplifiers are pumped by an increased pump power, but are maintained within the limits for material fracture for each individual optical parametric amplifier. A first optical parametric amplifier 301 and at least one additional optical parametric amplifier 302 are shown in FIG. 3.

A first pump pulse 303 is used to pump the first optical parametric amplifier 301. An incident signal pulse 305 is used to seed the first optical parametric amplifier 301. A first amplified signal pulse 306 and a first residual unconverted pump pulse 308 emanate from the first optical parametric amplifier 301. The first residual unconverted pump pulse 308 is discarded. The first amplified signal pulse 306 is directed into the at least one additional optical parametric amplifier 302.

At least one additional pump pulse 304 is used to pump the at least one additional optical parametric amplifier 302. The first amplified signal pulse 306 is directed into the at least one additional optical parametric amplifier 302. At least one additional amplified signal pulse 307 and at least one additional residual unconverted pump pulse 309 emanate from the at least one additional optical parametric amplifier 302. The at least one additional residual unconverted pump pulse 309 is discarded. The at least one additional amplified signal pulse 307 provides an increased power coherent optical pulse.

It is to be understood that additional pump pulses can be used to pump additional optical parametric amplifiers and the at least one additional amplified signal pulse 307 can be directed into the first of the additional optical parametric amplifiers. The additional amplified signal pulse that would emanate from the first of the additional optical parametric amplifiers would in turn be directed into the next optical parametric amplifier.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for producing an increased power coherent optical pulse, comprising:
   a first optical parametric amplifier,
   at least one additional optical parametric amplifier,
   a source of a first pump pulse that is direct into said first optical parametric amplifier,
   a source of a signal pulse that is direct into said first optical parametric amplifier,
   a source of at least one additional pump pulse that is direct into said at least one additional optical parametric amplifier, and
   a source of at least one additional signal pulse that is direct into said at least one additional optical parametric amplifier, said at least one additional optical parametric amplifier producing an output that results in said increased power coherent optical pulse.

2. The system for producing an increased power coherent optical pulse of claim 1 wherein said first optical parametric amplifier utilizes a first nonlinear crystal that produces an amplified signal pulse and said amplified signal pulse becomes said source of said at least one additional signal pulse that is direct into said at least one additional optical parametric amplifier, said at least one additional optical parametric amplifier utilizing a second nonlinear crystal producing an output that results in said increased power coherent optical pulse.

3. The system for producing an increased power coherent optical pulse of claim 1 wherein said source of a first pump pulse and said source of at least one additional pump pulse are produced by a common source.

4. The system for producing an increased power coherent optical pulse of claim 3 wherein said common source is a pump laser.

5. The system for producing an increased power coherent optical pulse of claim 1 including at least a second additional optical parametric amplifier, a source of at least a second additional pump pulse that is direct into said at least a second additional optical parametric amplifier, and a source of at least a second additional signal pulse that is direct into said at least a second additional optical parametric amplifier, said at least a second additional optical parametric amplifier producing said increased power coherent optical pulse.

6. A system for producing an increased power coherent optical pulse, comprising:

a first optical parametric amplifier;

at least one additional optical parametric amplifier;

a source of a first pump pulse that is direct into said first optical parametric amplifier;

a source of a signal pulse that is direct into said first optical parametric amplifier, said first optical parametric amplifier producing a first amplified signal pulse that is directed into said at least one additional optical parametric amplifier; and a source of at least one additional pump pulse that is direct into said at least one additional optical parametric amplifier, said at least one additional optical parametric amplifier producing an output pulse that is used to produce said increased power coherent optical pulse.

7. The system for producing an increased power coherent optical pulse of claim 6 including at least a second additional optical parametric amplifier, a source of at least a second additional pump pulse that is direct into said at least a second additional optical parametric amplifier, and wherein said output pulse from said at least one additional optical parametric amplifier becomes a source of at least a second additional signal pulse that is direct into said at least a second additional optical parametric amplifier, said at least a second additional optical parametric amplifier producing a second output pulse that is used to produce said increased power coherent optical pulse.

8. A method of producing an increased power coherent optical pulse, comprising the steps of:

providing a first optical parametric amplifier, providing at least one additional optical parametric amplifier, injecting a first pump pulse and a signal pulse into said first optical parametric amplifier producing a first amplified signal pulse from said first optical parametric amplifier, and injecting at least one additional pump pulse and said first amplified signal pulse into said at least one additional optical parametric amplifier producing said increased power coherent optical pulse from said at least one additional optical parametric amplifier.

9. The method of producing an increased power coherent optical pulse of claim 6 including the steps of:

providing at least a second additional optical parametric amplifier, injecting at least a second additional pump pulse into said at least a second additional optical parametric amplifier, and injecting at least a second additional signal pulse into said at least a second additional optical parametric amplifier producing said increased power coherent optical pulse from said at least a second additional optical parametric amplifier.

10. A method of producing an increased power coherent optical pulse, comprising the steps of:

providing a first optical parametric amplifier, providing at least one additional optical parametric amplifier, injecting a first pump pulse and a signal pulse into said first optical parametric amplifier producing a first amplified signal pulse from said first optical parametric amplifier, and injecting at least one additional pump pulse and said first amplified signal pulse into said at least one additional optical parametric amplifier producing an output pulse from said at least one additional optical parametric amplifier that is used to produce said increased power coherent optical pulse.

11. The method of producing an increased power coherent optical pulse of claim 10 including the steps of:

providing at least a second additional optical parametric amplifier, injecting at least a second additional pump pulse into said at least a second additional optical parametric amplifier, and injecting said output pulse from said at least one additional optical parametric amplifier as a signal pulse into said at least a second additional optical parametric amplifier producing a second output pulse from said at least one additional optical parametric amplifier that is used to produce said increased power coherent optical pulse.

* * * * *